United States Patent [19]

Mizutani et al.

[11] Patent Number: 5,408,758
[45] Date of Patent: Apr. 25, 1995

[54] SYSTEM FOR COMPENSATING SPATIAL ERRORS

[75] Inventors: Takashi Mizutani, Setagaya; Hiroshi Haino, Fuchu, both of Japan

[73] Assignee: Mitutoyo Corporation, Japan

[21] Appl. No.: 25,023

[22] Filed: Mar. 2, 1993

[30] Foreign Application Priority Data

Mar. 6, 1992 [JP] Japan .................. 4-084598

[51] Int. Cl.⁶ .............................................. G01B 5/03
[52] U.S. Cl. ......................................... 33/702; 33/503
[58] Field of Search ................ 33/702, 502, 503, 504, 33/505

[56] References Cited

U.S. PATENT DOCUMENTS

| | | | |
|---|---|---|---|
| 3,775,655 | 11/1973 | DuVall | 33/702 |
| 3,840,994 | 10/1974 | Izumi et al. | 33/503 |
| 4,709,482 | 12/1987 | Matsuura et al. | 33/503 |
| 4,769,763 | 9/1988 | Trieb et al. | 33/503 |
| 4,815,213 | 3/1989 | McCabe et al. | 33/702 |
| 4,941,265 | 7/1990 | Heiland | 33/503 |

FOREIGN PATENT DOCUMENTS

| | | | |
|---|---|---|---|
| 3704619 | 8/1988 | Germany | 33/702 |
| 0137545 | 8/1983 | Japan | 33/702 |
| 2227563 | 8/1990 | United Kingdom | 33/702 |
| 9000461 | 1/1990 | WIPO | 33/702 |

OTHER PUBLICATIONS

Zhang, G., et al., "Error Compensation of Coordinate Measuring Machines," *Annals of the CIRP* 34(1);445-448, 1985. No month.

*Primary Examiner*—Thomas B. Will
*Attorney, Agent, or Firm*—Seed and Berry

[57] ABSTRACT

A system for compensating for spatial errors of a movable machinery having a three-dimensional spatial mechanism includes a command generator for generating a commanded coordinate value in the space of command; a position controller for operating in response to the commanded coordinates value as an input; a position detector for detecting the operating position set by the position controller on the space of motion as a coordinate value of the space of command; and a spatial error compensating unit for compensating for spatial errors between the space of command and the space of motion contained in the output coordinate value of the position detector, outputting a compensated coordinate value as a measured value and correcting the commanded coordinate value by use of the compensated coordinate value, and the spatial error compensation and the motion control on the compensated space of command can be realized by use of only one system of function generator.

6 Claims, 5 Drawing Sheets

SYSTEM FOR COMPENSATING SPATIAL ERRORS

BACKGROUND OF THE INVENTION

1. Field of the Invention

This invention relates to a system for compensating for spatial errors caused between a space of command and a space of motion in a movable machinery having a three-dimensional spatial mechanism, for example, a three-dimensional coordinates measuring machine, a machine tool or a robot.

2. Description of the Related Art

In the movable machinery having a three-dimensional spatial mechanism, working errors may occur in the components constructing the movable machinery or deformation and/or strain due to temperature variations may occur in the components. When the above working errors, deformation and/or strain due to temperature variations occur, a space of motion in which the movable machinery actually moves does not correspond to a space of command for controlling the movement of the movable machinery. In order to solve the above problem, the spatial error compensation technology for compensating for spatial errors between the space of motion and the space of command is constructed by use of adequate algorithms of arithmetic. Particularly, various spatial error compensation techniques relating to the three-dimensional coordinates measuring machine (CMM) have been put to practice and the basic technology thereof has been developed in various manners.

In a case where the spatial error compensating system is mounted on the CMM, it is necessary to consider the requirement of the users that measured data (real data) obtained as a result of compensation for spatial errors between the space of command and the space of motion can actually be output from the CMM and the real data thus output can be processed.

It is also necessary to move the probe of the CMM to a given command position on a compensated space or the space of motion which has been compensated by the spatial error compensation technology. In this case, it is necessary to provide a reverse compensation system for correcting a commanded value on the space of command to match with the space of motion (compensated space) by use of a reversed function of a compensatory function used for compensating the measured value.

However, the conventional method which requires different functions for effecting the above spatial error compensation and the motion control on the compensated space necessitates two systems of function generators, and therefor, the function generating process will become redundant. Particularly, since most of the reverse functions of the compensatory functions are multiple-valued functions, the process in the reverse function generator will become complicated.

SUMMARY OF THE INVENTION

An object of this invention is to provide a spatial error compensating system capable of effecting the spatial error compensation and the motion control on a compensated space of motion by use of only one system of function generator.

In order to attain the above object, a system for compensating for spatial errors in this invention comprises a command generator for generating a commanded coordinates value in a space of command; a position controller for operating in response to the commanded coordinates value as an input; a position detector for detecting the operating position set by the position controller on a space of motion as a coordinates value of the space of command; and a spatial error compensator for compensating for spatial errors between the space of command and the space of motion contained in the output coordinates value of the position detector, outputting a compensated coordinates value as a measured value and correcting the commanded coordinates value according to the compensated coordinates value.

In this invention, since the spatial error contained in information of position on the space of motion obtained by the position detector is compensated in a path via which the information is fed back to the position controller, the measured value which is output to the exterior is already subjected to the spatial error compensation and the position control on the space of motion can be effected without using a reverse function which requires much processing load. Since it is not necessary to consider whether or not the reverse function is a multiple-valued function when the reverse function is not used, no limitation will be put on selection of spatial error compensating functions. It is also convenient that the motion can be directly specified by use of the commanded value on the space of command.

The above-described construction is made based on the assumption that the three-dimensional coordinates measuring machine is used, but it is not necessary to output the measured value to the exterior when the other movable machinery such as a robot is used.

DETAILED DESCRIPTION OF THE PREFERRED EMBODIMENTS

Figure 4:
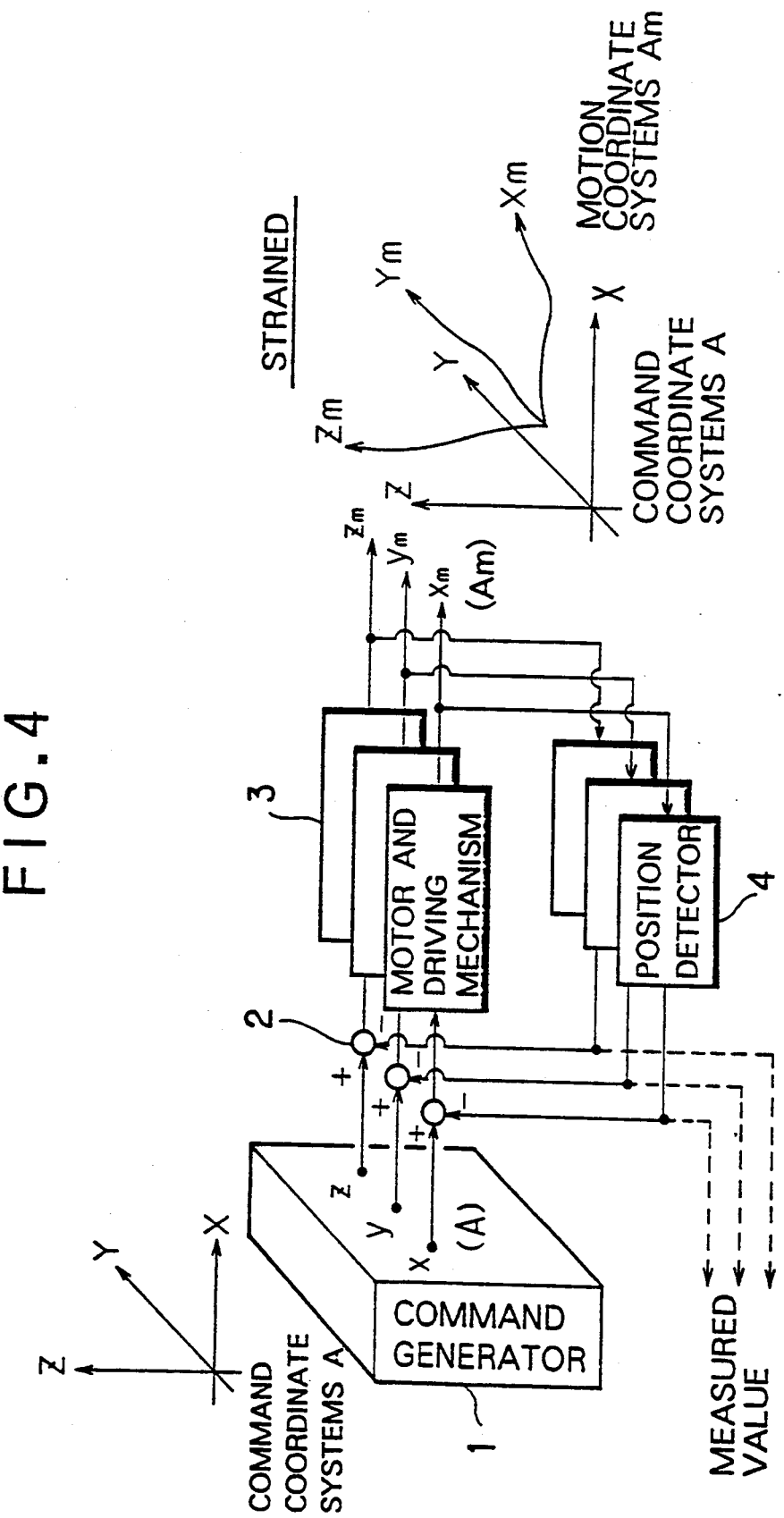
FIG. 4 is a diagram for illustrating spatial errors in a prior art position controlling system.

There will now be described an embodiment of this invention with reference to the accompanying drawings. FIG. 4 is a diagram for schematically showing the construction of an ordinary prior art position control system. The control system is roughly divided into two sections, that is, a command generator 1 for outputting position signals (x, y, z) in command coordinate systems A(X, Y, Z) for defining the motion as commanded values and a servo system for operating in response to the commanded coordinates value as an input. The servo system includes adder 2 for feedback, position controller 3 having motor and driving mechanism (such as screws or belts), and position controller (such as a linear scale) 4 for detecting the position set as a result of motion of the position controller 3 in each coordinate axis, and the above circuits are connected to construct a feedback control system (the explanation of the internal loop thereof is omitted).

In the prior art system of FIG. 4, if there is no difference between the space of command and the space of motion in all of the three axes, inputs and outputs in the servo system completely coincide with each other, that is, $x=x_m$, $y=y_m$ and $z=z_m$, and thus the input coordinate systems or command coordinate systems A(X, Y, Z) completely coincide with the output coordinate systems or motion coordinate systems Am(Xm, Ym, Zm).

However, the spatial mechanism generally has errors in the straightness and squareness. In addition, since the errors vary with a variation in the temperature, it is impossible to prevent the motion coordinate systems Am from having spatial strains with respect to the input coordinate systems A as indicated by coordinate systems shown on the right-hand side in FIG. 4. Further, since actual measured values are ($x_m$, $y_m$, $z_m$) in the CMM, they will contain measurement errors caused by the spatial errors.

Figure 5:
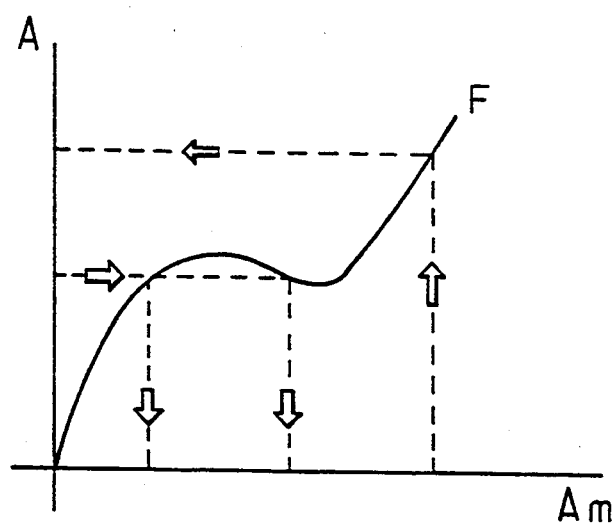
FIG. 5 is a diagram for explaining the spatial error compensating function.

The spatial error compensation technology becomes necessary in order to compensate for the above spatial strains. Values on the input coordinate systems A which are set to correspond to values on the motion coordinate systems Am can be detected by use of a laser interferometer, for example. Further, the function F used for converting the motion coordinate systems Am to the input coordinate systems A is proposed in various manners. The function F is used to compensate for the spatial strain between the motion coordinate systems Am and the input coordinate systems A. Therefore, the function F may be imaginarily formed as indicated by a curve shown in FIG. 5 and can be expressed by the following equation for convenience (T is a temperature).

$$A = F(Am, T) \qquad (1)$$

Figure 6:
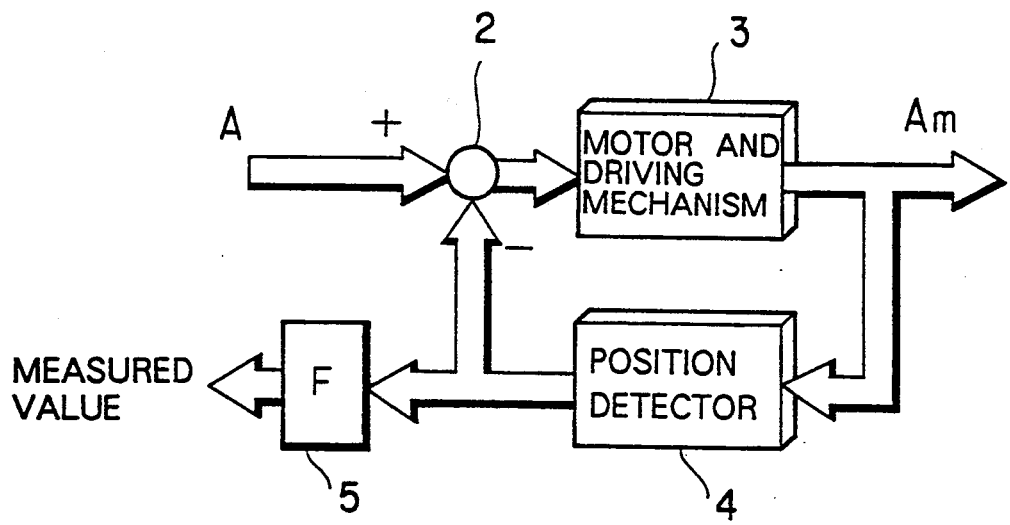
FIG. 6 is a diagram for explaining a conventional prior art spatial error compensating method.

If the function F of the equation (1) is obtained, a prior art system as shown in FIG. 6 for error compensation may be constructed. In this system, a measured value subjected to the spatial error compensation is output from an F converter 5 which compensates for the spatial errors according to the above function F to the external data processor.

However, in the prior art system of FIG. 6, when it is required to effect the precise positioning and/or path control in the command coordinate systems A, it becomes necessary to previously detect values of the motion coordinate systems Am which correspond to positions on the input coordinate systems A. In order to achieve the above purpose, the operation of compensation (which is conveniently referred to as the "reverse compensation") which has an inverted relation with respect to the operation of compensating the measured value becomes necessary. A function necessary for the reverse compensation becomes a reverse function $F^{-1}$ of the function F used for compensating the measured value and can be expressed by the following equation.

$$Am = F^{-1}(A) \qquad (2)$$

Figure 7:
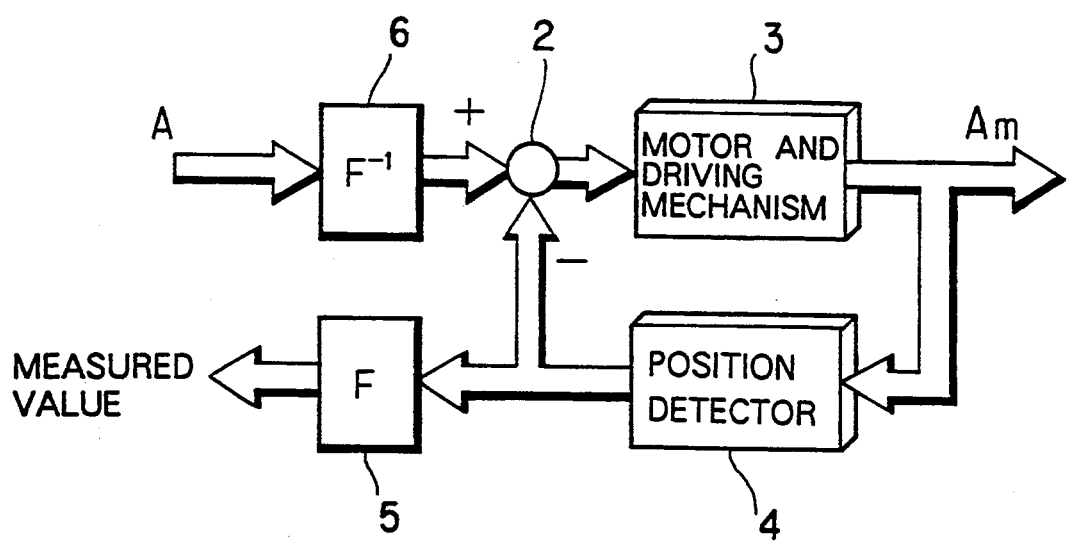
FIG. 7 is a diagram for explaining another conventional prior art spatial error compensating method.

The prior art system of FIG. 7 includes a $F^{-1}$ converter 6 for compensating the commanded values of the command coordinate systems according to the reverse function $F^{-1}$ of the equation (2) so as to make the commanded values adaptive to the space of motion. However, the reverse function $F^{-1}$ may become a multiple-valued function. Particularly, when precise error compensation is effected, the reverse function $F^{-1}$ may often become a multiple-valued function. In some cases, the reverse function cannot be derived. Even if the reverse function can be derived, it is considered necessary to effect a complicated process. From the above reason, a system for realizing the F converter 5 and $F^{-1}$ converter 6 becomes redundant. Further, when an attempt is made to easily obtain the reverse function $F^{-1}$, selection of the F function is limited.

Figure 1:
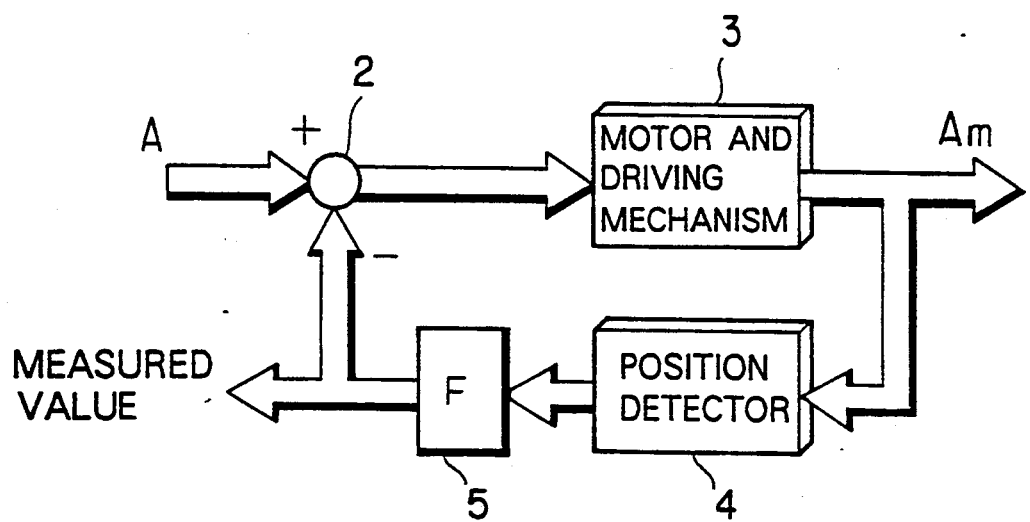
FIG. 1 is a construction diagram showing the principle of this invention.

In this invention, as shown in FIG. 1, the F converter 5 which is one of the constituents shown in FIG. 6 is inserted in the feedback path extending from the position detector 4 to the adder 2. With this construction, the measured value which is subjected to the spatial error compensation can be output to the exterior, and at the same time, a value which is already subjected to the spatial error compensation is fed back to the adder 2. As a result, it becomes unnecessary to subject the commanded values of the command coordinate systems A input from the exterior to the reverse conversion. This structure makes it possible to omit the $F^{-1}$ converter 6. Therefore, the load of the processing system can be alleviated and selection of the function F is not limited.

Figure 2:
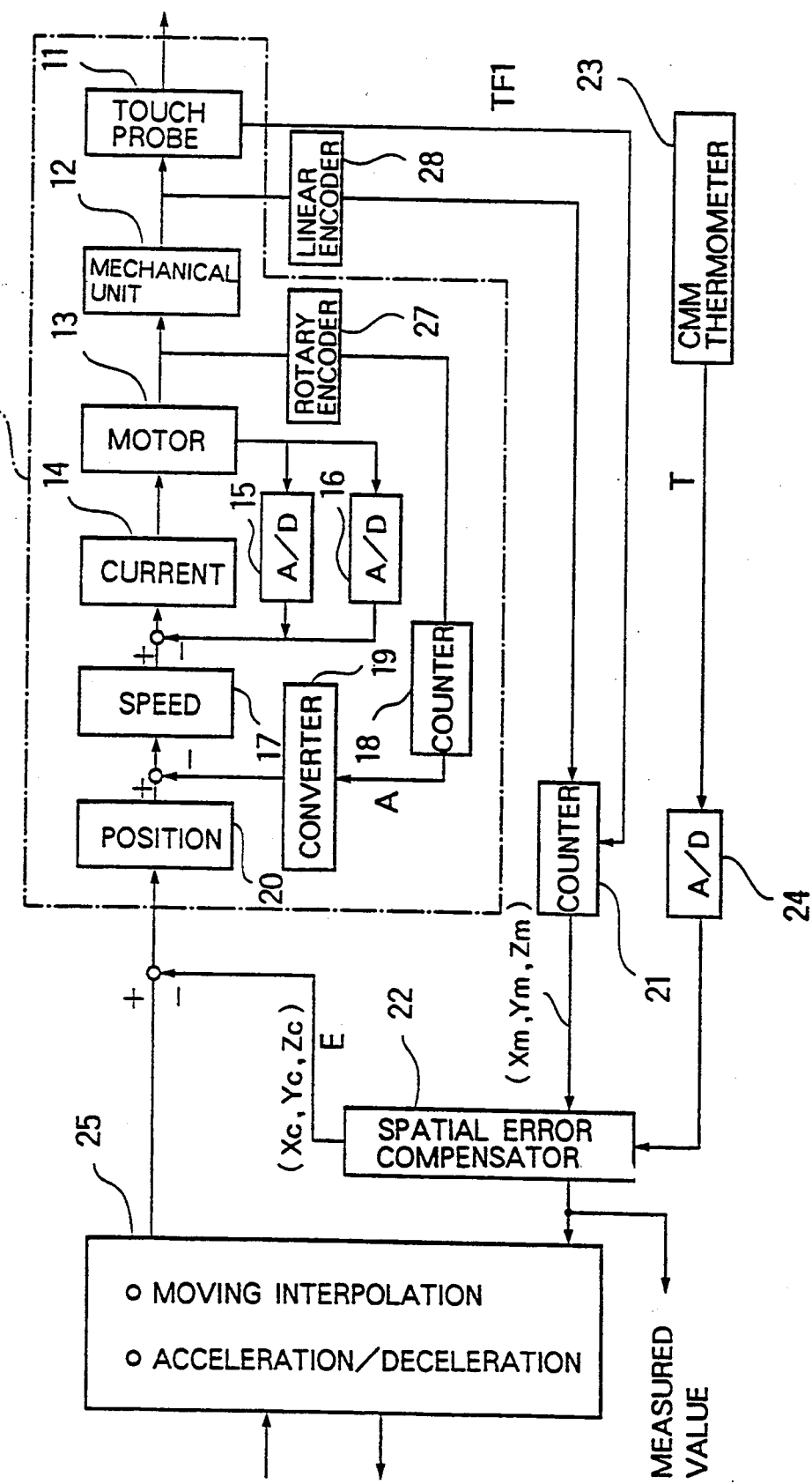
FIG. 2 is a block diagram showing an embodiment of this invention.

FIG. 2 is a block diagram showing one embodiment of this invention applied to a three-dimensional coordinates measuring machine. The CMM in this example is used to automatically measure the contour of a work by detecting the coordinate position of a contact type probe or touch probe 11 set at the instant the stylus (not shown) of the probe 11 is brought into contact with the work. The driver of a mechanical unit 12 is a motor 13 and the driving current therefore is pulse-width amplified in a current control unit 14. At this time, an electric current in the motor 13 is detected by A/D converters 15 and 16 whose outputs are fed back to enhance the control precision.

In the above servo system, the position control and speed control are effected. For the speed control, an output pulse of a rotary encoder 27 for detecting the rotation of the motor 13 is counted by a counter 18. Further, the count of the counter 18 is converted to a motor rotation speed in a converter 19 and the converted value is fed back to a speed controller 17.

For the position control, an output pulse of a linear encoder 28 (corresponding to the position detector 4 in FIG. 1) attached to the mechanical unit 12 is counted by a scale counter 21. The counter 21 supplies signals representing the output coordinate values Am (Xm, Ym, Zm) to a spatial error compensator 22 when it receives a signal TF1 generated at the instant the touch probe 11 is brought into contact with the work. At the same time, a temperature T measured by a thermometer 23 for CMM is converted to a digital value by an A/D converter 24 and supplied to the spatial error compensator 22 as temperature information. The spatial error compensator 22 effects the F conversion of equation (1) by use of the temperature T and output coordinate values Am. The position control is effected by feeding back an output E(Xc, Yc, Zc) of the compensator 22 to a position control circuit 20. The output E corresponds to A in the equation (1).

A main controller 25 effects the moving interpolation process, acceleration/deceleration control and the like to supply commands to the position control circuit 20.

The spatial error compensator 22 corresponds to the converter 5 of FIG. 1 and is inserted into a feedback path extending from the position detector (scale counter 21). Therefore, a measured value which is subjected to the spatial error compensation can be output to the exterior and it is not necessary to subject the commanded value for the space of motion to the reverse compensation.

Figure 3:
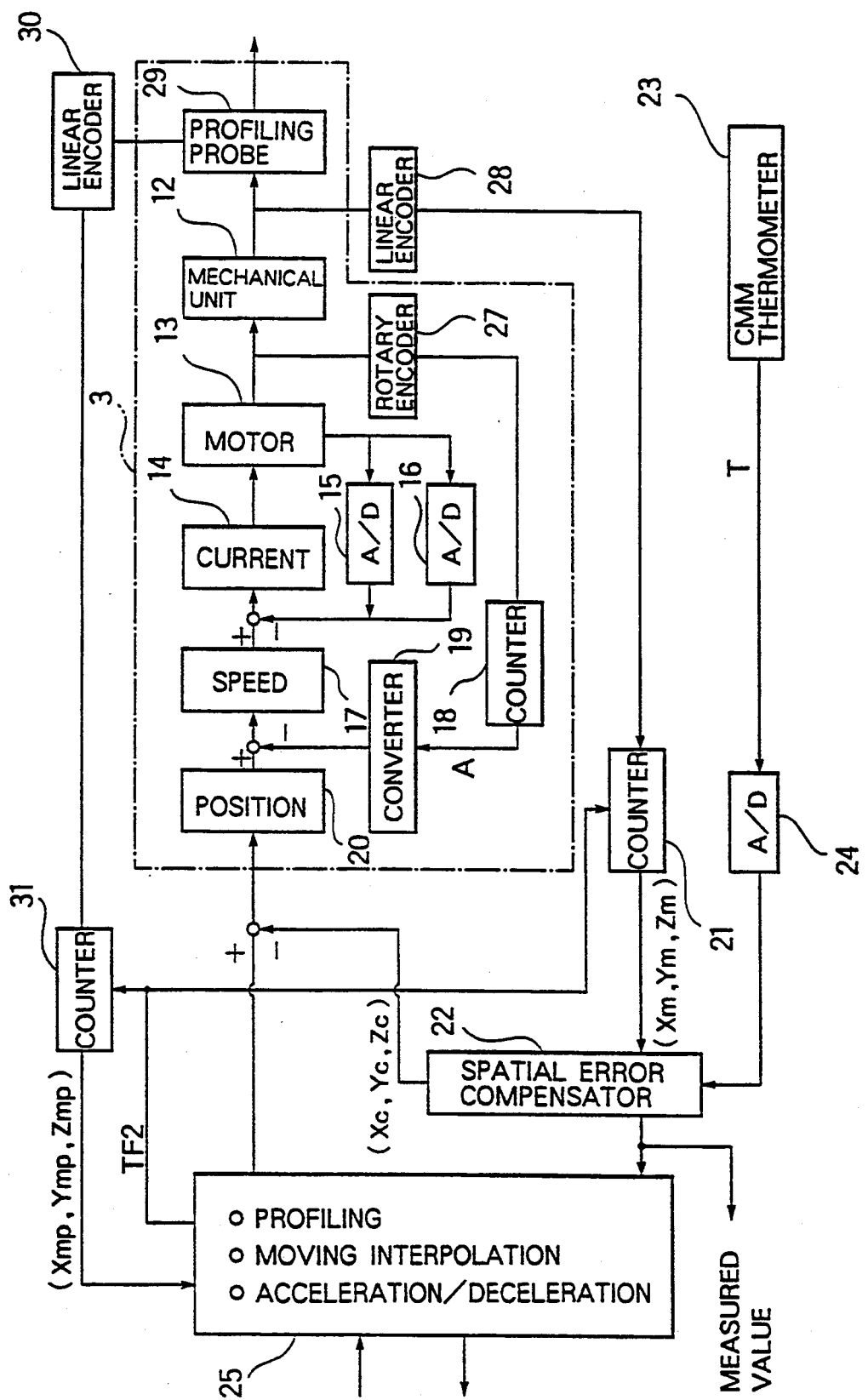
FIG. 3 is a block diagram showing another embodiment of this invention.

FIG. 3 is a block diagram showing another embodiment of this invention applied to a CMM to which a profiling probe 29 is attached instead of the touch probe 11. In the case of using the profiling probe 29, a profiling control system for maintaining the state in which the profiling probe 29 can always be set in contact with a work in a permissible displacement range is additionally provided in the main controller 25. In the system of FIG. 3, there is no touch signal which may be generated from the touch probe, and therefore, a data fetching signal TF2 is generated from the main controller 25. When the signal TF2 is supplied to a counter 21, the counter 21 supplies the present count (Xm, Ym, Zm) to a spatial error compensator 22. The counter 21 counts the coordinate values (Xm, Ym, Zm) of the reference position of the profiling probe 29. A linear encoder 30 provided in the profiling probe 29 detects the displacement in the state in which the stylus (not shown) of the profiling probe 29 is set in contact with the work. An output pulse from the linear encoder 30 is counted by a counter 31. When receiving the signal TF2, the counter 31 supplies coefficient values (Xmp, Ymp, Zmp) representing the displacement amount of the stylus to the main controller 25.

In the signal processing path of the system shown in FIG. 3, the displacement signal of the stylus of the profiling probe 29 is not subjected to the spatial error compensation. Since the displacement range of the stylus displacement signal (Xmp, Ymp, Zmp) is extremely small in comparison with the variation range of (Xm, Ym, Zm), the measurement precision of the entire portion of the CMM device will not be influenced even if the signal is not subjected to the spatial error compensation according to this invention. Omission of the spatial error compensation at this stage is effective to simplify the whole system construction.

As described above, according to this invention, since the spatial error compensation system is inserted into the motion feedback path in the movable machinery having the three-dimensional spatial mechanism, both of the spatial error compensation and the motion control on the space of motion can be achieved by use of only one system of function generator.

What is claimed is:

1. A spatial error compensating system of three-dimensional spatial mechanism comprising:
    command generating means for generating a commanded coordinates value in a space of command;
    position controlling means for operating in response to the commanded coordinates value as an input;
    position detecting means for detecting the operating position of a standard element whose position is controlled by said position controlling means on a space of motion as a coordinates value of the space of command; and
    spatial error compensating means for compensating for spatial errors between the space of command and the space of motion contained in the output coordinates value of said position detecting means by use of a converting function obtained by actual measurement for converting a coordinate value in the coordinate system of the space of motion to a corresponding coordinate value in the coordinate system of the space of command, and correcting the commanded coordinates value by use of the compensated coordinates value, said spatial error compensating means including a storing means for storing the converting function.

2. A three-dimensional coordinates measuring machine comprising:
    command generating means for generating a commanded coordinates value in a space of command;
    position controlling means for operating in response to the commanded coordinates value as an input;
    position detecting means for detecting the operating position of a standard element whose position is controlled by said position controlling means on a space of motion as a coordinates value of the space of command; and
    spatial error compensating means for compensating for spatial errors between the space of command and the space of motion contained in the output coordinates value of said position detecting means by use of a converting function obtained by actual measurement for converting a coordinate value in the coordinate system of the space of motion to a corresponding coordinate value in the coordinate system of the space of command, outputting a compensated coordinates value as a measured value and correcting the commanded coordinates value by use of the compensated coordinates value, said spatial error compensating means including a storing means for storing the converting function.

3. A three-dimensional coordinates measuring machine according to claim 2, wherein said spatial error compensating means includes temperature measuring means and compensates for the spatial errors by using an output signal of said measuring means as a reference signal.

4. A three-dimensional coordinates measuring machine according to claim 2, wherein said standard element whose position is controlled by said position controlling means is a touch probe.

5. A three-dimensional coordinates measuring machine according to claim 2, wherein said standard element whose position is controlled by said position controlling means is a profiling probe.

6. A spatial error compensating method effected by use of a three-dimensional moving mechanism which includes moving means for freely moving a standard element which is placed in a motion coordinate system of the space of motion, position measuring means for measuring coordinate values of the position of said standard element in the motion coordinate system, and control means for controlling said moving means to set an output of said position measuring means to such a value as to correspond to a commanded coordinate value of the space of command input from the exterior, comprising the steps of measuring the relation between a signal output from said position measuring means and said commanded coordinate value as a function of errors; and adding a value used for compensating for an error derived from the function of errors and an output of said position measuring means to said commanded coordinate value and supplying the result of addition to said control means.

* * * * *